UNITED STATES PATENT OFFICE.

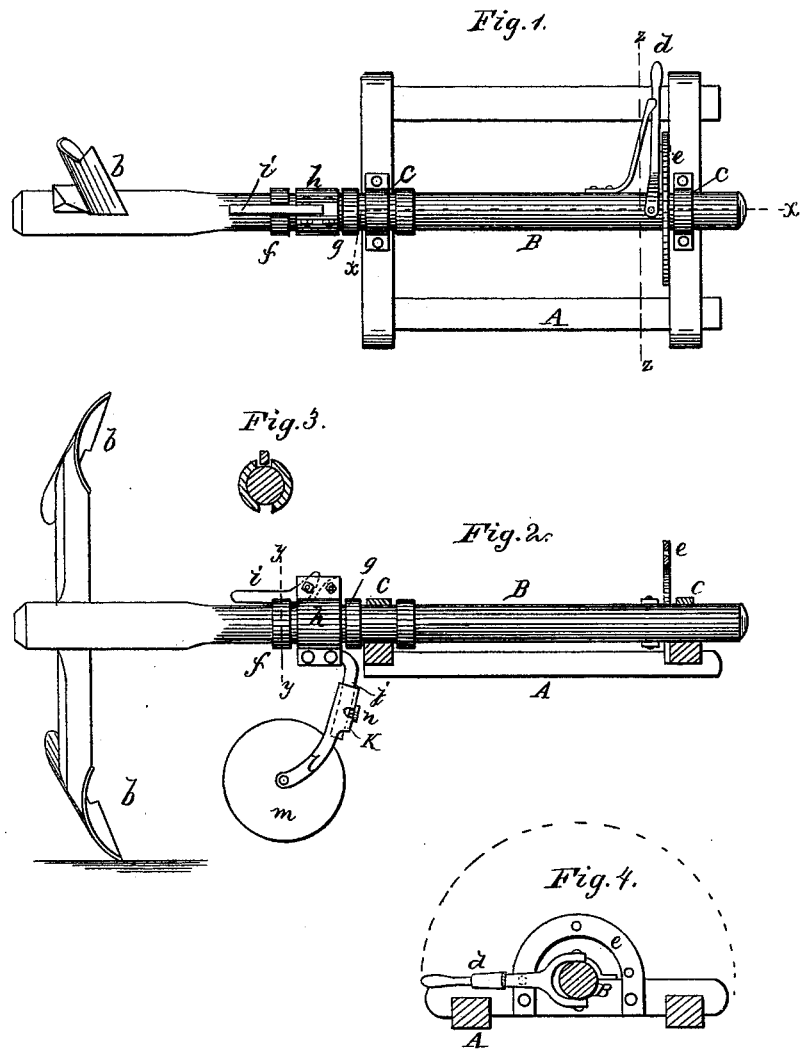

CHARLES DANIEL, OF VIRGINIA, MISSOURI.

IMPROVEMENT IN PLOW-COLTERS.

Specification forming part of Letters Patent No. 204,484, dated June 4, 1878; application filed February 25, 1878.

*To all whom it may concern:*

Be it known that I, CHARLES DANIEL, of Virginia, in the county of Bates and State of Missouri, have invented a new and Improved Rotary Colter for Reversible Plows, of which the following is a specification:

Figure 1 is a plan view of a reversible plow having my improved colter attached. Fig. 2 is a longitudinal section taken on line $x\ x$ in Fig. 1. Fig. 3 is a transverse section taken on line $y\ y$ in Fig. 2. Fig. 4 is a transverse section taken on line $z\ z$ in Fig. 1.

Similar letters of reference indicate corresponding parts.

The object of my invention is to provide a rotary colter that is adapted to reversible or hill-side plows.

The invention consists in a cutting-wheel that is journaled in a swiveled support and attached to a sleeve on the plow-beam, said sleeve being provided with a latch that engages a notched collar on the beam.

Referring to the drawing, A is a frame, which is supported on wheels, (not shown in drawing,) and carries the beam B, to which are attached the right and left hand plows $b$. The beam is journaled in boxes $c$, and is provided with a shifting-lever, $d$, which engages an apertured curved bar, $e$, attached to the frame A, and holds the plows either in a working or carrying position. Between the frame A and the plows $b$ there are two collars, $f\ g$, on the beam B, which are placed a few inches apart. The collar $f$ is notched at diametrically-opposite points, and between the two collars a sleeve, $h$, is placed on the plow-beam B, and is provided with a latch, $i$, which is pivoted between ears projecting from one side of the sleeve, and to the opposite side of the sleeve a shank, $j$, is attached, which projects from the sleeve nearly at a right angle.

Upon the shank $j$ a sleeve, $k$, is placed, from which the disk $m$ is journaled. The sleeve $k$ is slotted transversely to receive a pin, $n$, that projects from the shank, and limits the motion of the sleeve on the shank. The periphery of the disk $m$ is sharpened, so that it cuts through the soil as the plow is drawn forward.

When the plow is reversed the colter is inverted, the latch $i$ drops out of the notch in the collar $f$, and permits the colter to swing around on the beam into a working position, when it is again locked by the latch $i$. As the colter is swiveled on its shank, it acts as a caster, and does not strain its supports, but readily follows the direction of the plow.

Having thus described my invention, I claim as new and desire to secure by Letters Patent—

The combination, with a swiveled colter and the beam B, of the collar $f$, notched at opposite points, and the sleeve $h$, having pivoted latch $i$, as and for the purpose specified.

CHARLES DANIEL.

Witnesses:
 B. G. WHEELER,
 H. H. HOOELY.